(12) United States Patent
Leung

(10) Patent No.: US 12,273,272 B2
(45) Date of Patent: Apr. 8, 2025

(54) METHOD AND SYSTEMS FOR REDUCING NETWORK LATENCY

(71) Applicant: Pismo Labs Technology Limited, Kowloon (HK)

(72) Inventor: Wan Chun Leung, New Territories (HK)

(73) Assignee: Pismo Labs Technology Limited, Kowloon (HK)

( * ) Notice: Subject to any disclaimer, the term of this patent is extended or adjusted under 35 U.S.C. 154(b) by 0 days.

(21) Appl. No.: 18/398,132

(22) Filed: Dec. 27, 2023

(65) Prior Publication Data

US 2024/0129239 A1 Apr. 18, 2024

Related U.S. Application Data

(63) Continuation of application No. 17/436,071, filed as application No. PCT/IB2020/060960 on Nov. 20, 2020, now Pat. No. 11,895,031.

(51) Int. Cl.
| | |
|---|---|
| *H04L 47/125* | (2022.01) |
| *H04L 43/0852* | (2022.01) |
| *H04L 47/2416* | (2022.01) |
| *H04L 47/32* | (2022.01) |

(52) U.S. Cl.
CPC ........ *H04L 47/125* (2013.01); *H04L 43/0858* (2013.01); *H04L 47/2416* (2013.01); *H04L 47/32* (2013.01)

(58) Field of Classification Search
CPC ............... H04L 47/125; H04L 43/0858; H04L 47/2416; H04L 47/32
See application file for complete search history.

(56) References Cited

U.S. PATENT DOCUMENTS

| | | | |
|---|---|---|---|
| 6,178,448 B1 | 1/2001 | Gray et al. | |
| 6,862,618 B1 | 3/2005 | Gray et al. | |
| 10,789,005 B2 | 9/2020 | Yu et al. | |
| 2004/0236855 A1* | 11/2004 | Peles ...................... | H04L 69/40 |
| | | | 709/227 |
| 2011/0235650 A1 | 9/2011 | Martinez et al. | |

(Continued)

FOREIGN PATENT DOCUMENTS

CN 110062352 A 7/2019

OTHER PUBLICATIONS

International Search Report in International Application No. PCT/IB2020/060960, mailed on Aug. 18, 2021.

(Continued)

*Primary Examiner* — Jackie Zuniga Abad
(74) *Attorney, Agent, or Firm* — Hershkovitz & Associates, PLLC; Abe Hershkovitz

(57) ABSTRACT

The present invention discloses methods and systems for reducing network latency. A first network device establishes a plurality of connections with a second network device. After that, determining non-congesting latency of each of the plurality of connections. Assigning a weighting to each of the plurality of connections. Decreasing the weighting of a connection when the performance of the connection deteriorated according to a first criteria. The first network device may perform weight decreasing again after a time interval. Last, sending data packets through the plurality of connections according to the weightings.

20 Claims, 17 Drawing Sheets

(56) References Cited

U.S. PATENT DOCUMENTS

| | | | |
|---|---|---|---|
| 2011/0235651 A1 | 9/2011 | Martinez et al. | |
| 2017/0111250 A1 | 4/2017 | Chan et al. | |
| 2018/0062875 A1 | 3/2018 | Tumuluru | |
| 2018/0367332 A1* | 12/2018 | Sung | H04L 1/189 |
| 2019/0312816 A1 | 10/2019 | Shen et al. | |
| 2020/0225865 A1 | 7/2020 | Yu et al. | |
| 2020/0236043 A1* | 7/2020 | Sze | H04L 47/283 |
| 2020/0348877 A1 | 11/2020 | Yu et al. | |

OTHER PUBLICATIONS

Written Opinion of the International Searching Authority in International Application No. PCT/IB2020/060960, mailed on Aug. 18, 2021.
International Preliminary Report on Patentability in International Application No. PCT/IB2020/060960, issued on May 16, 2023.
English Language Abstract of CN 110062352 A (Jul. 26, 2019).
Sungjin Shin et al., "TCP and MPTCP Retransmission Timeout Control for Networks Supporting WLANs", IEEE Communications Letters, vol. 20, No. 5, May 31, 2016.

* cited by examiner

|  | Weightings of WAN-to-WAN connections | | | | | |
|---|---|---|---|---|---|---|
|  | 120a | 120b | 120c | 120d | 120e | 120f |
| Default Weightings | 100 | 100 | 100 | 100 | 100 | 100 |

Fig. 2A

| | Latency of WAN-to-WAN connections | | | | | |
|---|---|---|---|---|---|---|
| Time | 120a | 120b | 120c | 120d | 120e | 120f |
| NCL | 100 ms | 200 ms | 130 ms | 50 ms | 300 ms | 70 ms |

Fig. 2B

| | Latency of WAN-to-WAN connections | | | | | |
|---|---|---|---|---|---|---|
| Time | 120a | 120b | 120c | 120d | 120e | 120f |
| t=0 ms | 100 ms | 200 ms | 130 ms | 50 ms | 300 ms | 70 ms |
| t=500 ms | 100 ms | 220 ms | 120 ms | 60 ms | 450 ms | 200 ms |
| t=1000 ms | 100 ms | 250 ms | 200 ms | 60 ms | 600 ms | 300 ms |
| t=1500 ms | 100 ms | 500 ms | 120 ms | 60 ms | 900 ms | 70 ms |

Fig. 2D

| | Weightings of WAN-to-WAN connections | | | | | |
|---|---|---|---|---|---|---|
| Time | 120a | 120b | 120c | 120d | 120e | 120f |
| t=0 ms | 100 | 100 | 100 | 100 | 100 | 100 |
| t=500 ms | 100 | 100 | 100 | 100 | 80 | 50 |
| t=1000 ms | 100 | 100 | 80 | 100 | 60 | 40 |
| t=1500 ms | 100 | 60 | 80 | 100 | 30 | 40 |

Fig. 2E

| | Weightings of WAN-to-WAN connections | | | | | |
|---|---|---|---|---|---|---|
| Time | 120a | 120b | 120c | 120d | 120e | 120f |
| t=0 ms | 100 | 100 | 100 | 100 | 100 | 100 |
| t=500 ms | 100 | 100 | 100 | 100 | 80 | 50 |
| t=1000 ms | 100 | 100 | 80 | 100 | 60 | 40 |
| t=1500 ms | 100 | 60 | 100 | 100 | 30 | 100 |

Fig. 2F

| | Weightings of WAN-to-WAN connections | | | | | |
|---|---|---|---|---|---|---|
| | 120a | 120b | 120c | 120d | 120e | 120f |
| Initial Weightings | 50 | 100 | 50 | 120 | 60 | 100 |

Fig. 2G

| Time | Latency of WAN-to-WAN connections ||||||
| --- | --- | --- | --- | --- | --- | --- |
| | 120a | 120b | 120c | 120d | 120e | 120f |
| t=0 ms | 100 ms | 200 ms | 130 ms | 50 ms | 400 ms | 70 ms |
| t=1000 ms | 100 ms | 220 ms | 120 ms | 60 ms | 450 ms | 200 ms |
| t=2000 ms | 400 ms | 500 ms | 350 ms | 230 ms | 900 ms | 800 ms |
| t=3000 ms | 110 ms | 180 ms | 130 ms | 50 ms | 400 ms | 70 ms |

Fig. 3B

|  | Weightings of WAN interfaces | | |
|---|---|---|---|
|  | 406 | 407 | 408 |
| Initial Weightings | 100 | 100 | 100 |

Fig. 8A

|  | Latency of WAN interfaces | | |
|---|---|---|---|
| Time | 406 | 407 | 408 |
| NCL | 150 ms | 200 ms | 70 ms |

Fig. 8B

METHOD AND SYSTEMS FOR REDUCING NETWORK LATENCY

RELATED APPLICATIONS

The present application is a non-provisional Continuation Application, which claims the benefits of and is based on U.S. application Ser. No. 17/436,071, filed on Sep. 2, 2021, which claims the benefits of and is based on International Application No. PCT/IB2020/060960, filed on Nov. 20, 2020, and is related to U.S. application Ser. No. 18/398,133 and U.S. application Ser. No. 18/398,135, both filed on Dec. 27, 2023, the disclosures of which are hereby incorporated by specific reference thereto.

TECHNICAL FIELD

The present invention relates in general to the field of computer networks, more particularly, the present invention relates to methods and systems for improving network performance by reducing network latency.

BACKGROUND ART

Over a network, network performance may vary. Latency is one of the performance metrics that is widely used to benchmark network performance.

When the latency of a connection increases, it usually implies that the connection becomes congested. When a connection is congested, a bufferbloat phenomenon may occur, which may cause data packets being queued for a longer time. This may result in a severe delay for some real-time applications, such as instant messaging services, voice over IP (VoIP), online gaming, IP-television applications.

In a first-in-first-out queue management network, too many buffers may increase latency significantly.

Apart from simply making buffers smaller, multiple techniques are known to prevent the effects caused by bufferbloat. For example, during network congestion, some data packets may either be dropped or marked with appropriate Explicit Congestion Notification (ECN) bits. Another known technique is Active Queue Management (AQM). AQM allows a router to manage its queue sizes to prevent extensive use of buffers while still making use of them when needed. Another known technique implementation of this is Random Early Detection (RED). However, all of these known techniques are unable to improve the total network performance when a network device has multiple WANs to send data packets.

SUMMARY OF INVENTION

The present invention discloses methods and systems for reducing network latency. A first network device establishes a plurality of connections with a second network device. After that, determining non-congesting latency of each of the plurality of connections. Assigning a weighting to each of the plurality of connections. Decreasing the weighting of a connection when the performance of the connection deteriorated according to a first criteria. The first network device may perform weight decreasing again after a time interval. Last, sending data packets through the plurality of connections according to the weightings.

BRIEF DESCRIPTION OF DRAWINGS

FIG. 2A is a table storing the initial weightings of WAN-to-WAN connections according to the embodiments of the present invention.

FIG. 2B is a table storing the non-congested latencies of WAN-to-WAN connections according to the embodiments of the present invention.

FIG. 2D is a table of latency estimated of WAN-to-WAN connections according to the embodiments of the present invention.

FIG. 2E is a table of weightings for each of WAN-to-WAN connections according to the embodiments of the present invention.

FIG. 2F is another table of weightings for each of WAN-to-WAN connections according to the embodiments of the present invention.

FIG. 2G is a table storing the initial weightings of WAN-to-WAN connections according to the embodiments of the present invention.

FIG. 3B is a table illustrating latency estimated for WAN-to-WAN connections during the time period according to the embodiments of the present invention.

FIG. 8A is a table of weightings for each of WAN interfaces according to the embodiments of the present invention.

FIG. 8B is a table of latencies for each of WAN interfaces according to the embodiments of the present invention.

DESCRIPTION OF EMBODIMENTS

Figure 1A:
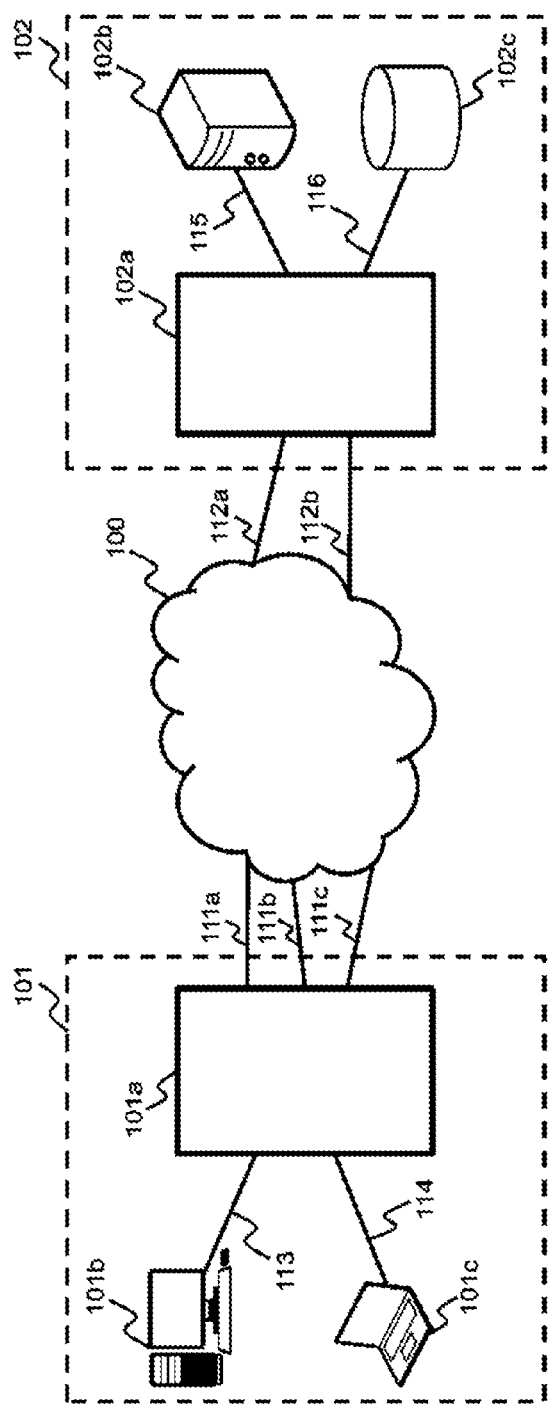
FIGS. 1A and 1B illustrate a network environment according to various embodiments of the present invention.

The present invention advantageously addresses the needs above, which provides the systems and methods that achieve improved network performance by reducing latency arising from bufferbloat.

The ensuing description provides preferred exemplary embodiment(s) and exemplary embodiments only, and is not intended to limit the scope, applicability or configuration of the invention. Rather, the ensuing description of the preferred exemplary embodiment(s) and exemplary embodiments will provide those skilled in the art with an enabling description for implementing a preferred exemplary embodiment of the invention. It is understood that various changes may be made in the function and arrangement of elements without departing from the spirit and scope of the invention as set forth in the appended claims.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware or microcode, the program instructions to perform the necessary tasks may be stored in a computer-readable storage medium. A processing unit(s) may be realized by virtualization, and may be a virtual processing unit(s) including a virtual processing unit in a cloud-based instance.

The program instructions making up the various embodiments may be stored in a storage medium. Moreover, as disclosed herein, the term "computer-readable storage medium" may represent one or more devices for storing data, including read-only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine-readable mediums for storing information. The term "computer-readable storage medium" may also include, but is not limited to portable or fixed storage devices, optical storage mediums, magnetic mediums, memory chips or cartridges, wireless channels and various other mediums capable of storing, containing or carrying instruction(s) and/or data. A computer-readable storage medium may be realized by virtualization, and may be a virtual computer-readable storage medium including a virtual computer-readable storage medium in a cloud-based instance.

Embodiments of the present invention are related to the use of a computer system for implementing the techniques described herein. In an embodiment, the inventive processing units may reside on a machine such as a computer platform. According to one embodiment of the invention, the techniques described herein are performed by a computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps described herein. In alternative embodiments, hardwired circuitry may be used in place of or in combination with software instructions to implement the invention. Thus, embodiments of the invention are not limited to any specific combination of hardware circuitry and software.

Also, it is noted that the embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "secondary storage" and "main memory" may represent one or more devices for storing data, including read-only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to portable or fixed storage devices, optical storage devices, wireless channels and various other mediums capable of storing, containing or carrying instruction(s) and/or data. A machine-readable medium may be realized by virtualization, and may be a virtual machine-readable medium including a virtual machine-readable medium in a cloud-based instance.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as storage medium. A processing unit(s) may perform the necessary tasks. A processing unit(s) may be a CPU, an ASIC semiconductor chip, a semiconductor chip, a logical unit, a digital processor, an analog processor, a FPGA or any processor that is capable of performing logical and arithmetic functions. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. A processing unit(s) may be realized by virtualization and may be a virtual processing unit(s) including a virtual processing unit in a cloud-based instance.

An end-to-end connection may use a connection-oriented protocol, such as Transmission Control Protocol (TCP), or connectionless protocol, such as User Datagram Protocol (UDP), to transmit packets. Well-known protocols for deploying end-to-end connections include Layer 2 Tunnelling Protocol (L2TP), secure shell (SSH) protocol, Multi-protocol Label Switching (MPLS), and Microsoft's Point-to-Point Tunnelling Protocol (PPTP). A connection connected to a network interface is in the form of optical fibre, Ethernet, ATM, Frame Relay, T1/E1. IPv4, IPv6, wireless technologies, Wi-Fi, WiMax, High-Speed Packet Access technology, 3GPP Long Term Evolution (LTE) or the like.

A network interface may be a virtual network interface, including a virtual network interface in a cloud-based instance.

A host may be a computing device, a laptop computer, a mobile phone, a smartphone, a desktop computer, a switch, a router or an electronic device that is capable of transmitting and receiving packets. A transmitting host is a host transmitting a packet. A transmitting host may also be a network device receiving packets from a host and then transmitting the packets according to policies and/or determined routes. A receiving host is a host receiving the packets. A receiving host may also be a network device receiving packets from a host and then transmitting the packets according to policies and/or determined routes. Therefore, a host may be a transmitting host and a receiving host.

FIG. 1A illustrates a system adapted according to embodiments of the present invention. The system includes at least two sites 101 and 102. Each site comprises at least one network device, such as network device 101a and 102a. The hosts and the at least one network device in the same site are in the same local area network (LAN).

Figure 4A:
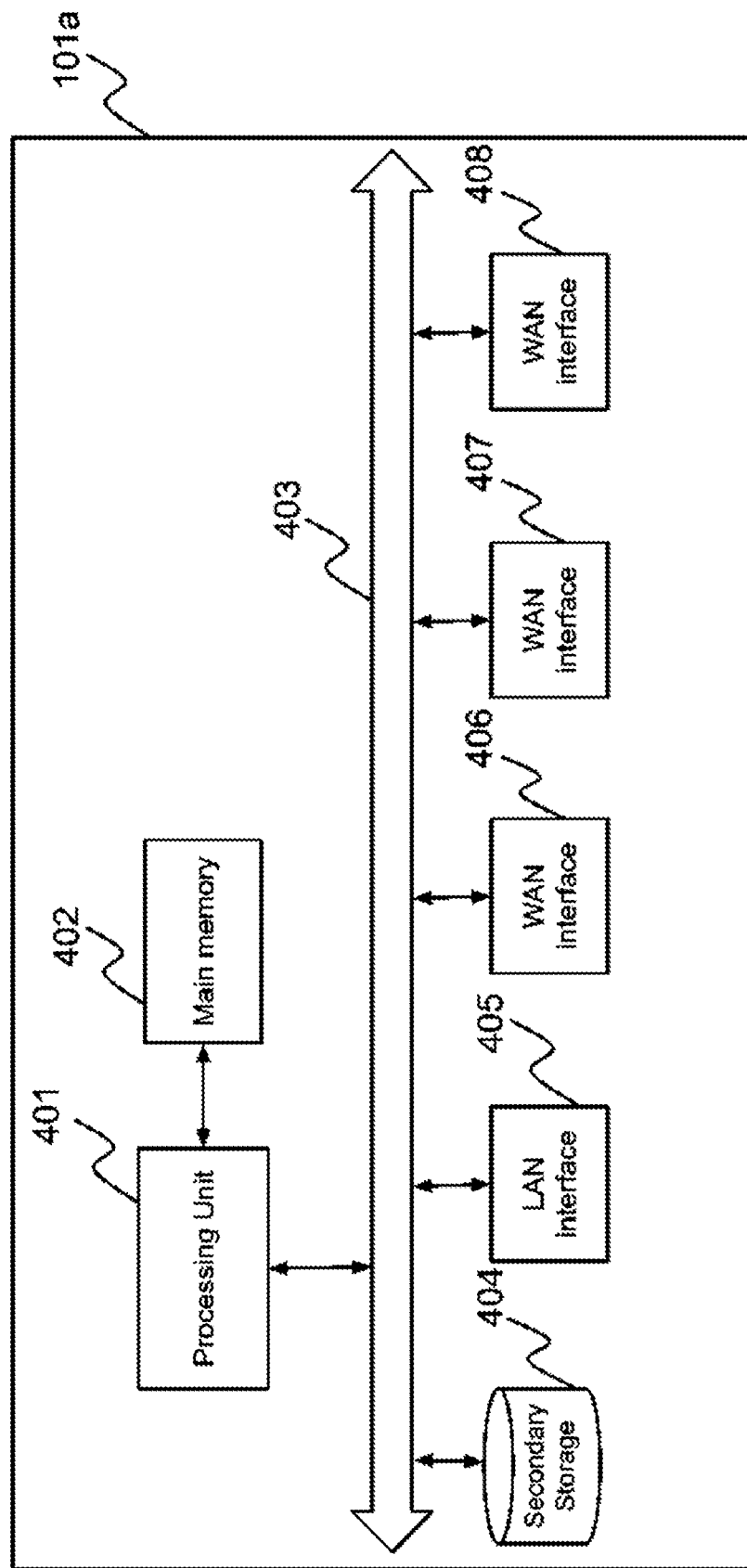
FIG. 4A is a block diagram of a network device of the present invention.
Figure 4B:
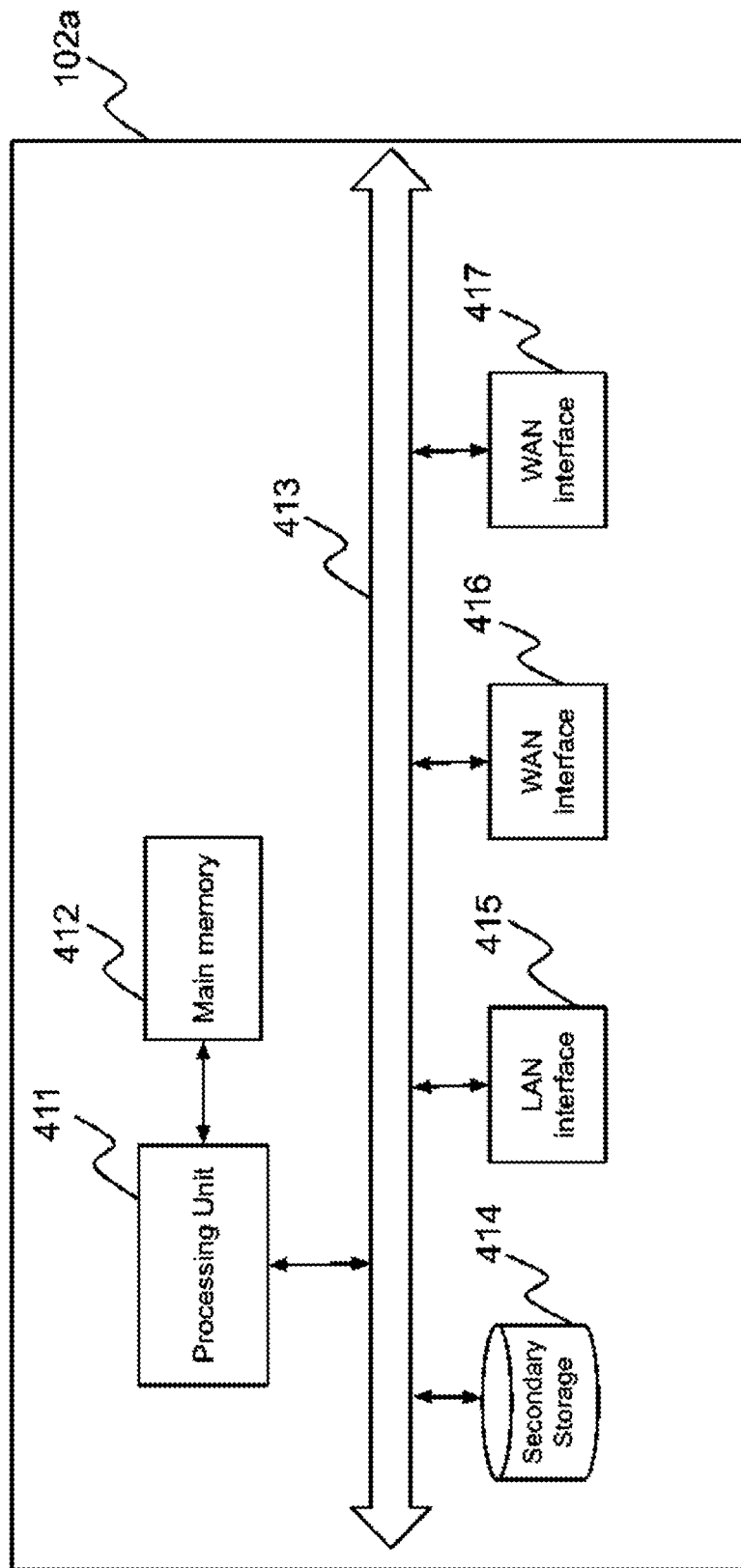
FIG. 4B is a block diagram of another network device of the present invention.

FIG. 4A and FIG. 4B illustrate two network devices according to the embodiments of the present invention. FIG. 4A illustrates a block diagram of network device 101a, and FIG. 4B illustrates a block diagram of network device 101b. Network device 102a may include processing unit(s) 411, main memory 412, system bus 413, secondary storage 414, at least one LAN interface, such as LAN interface 415, and at least two wide area network (WAN) interfaces, such as WAN interfaces 416 and 417. Network device 101a, similar to network device 102a, may include processing unit(s) 401, main memory 402, system bus 403, secondary storage 404, at least one LAN interface, such as LAN interface 405, and at least two wide area network (WAN) interfaces, such as WAN interfaces 406 and 407. Network device 101a may further include a WAN interface 408. One of the differences between network devices 101a and 102a is the number of WAN interfaces. The following description for network device 101a is also applicable for network device 102a.

Secondary storage 404 and main memory 402 are computer-readable storage media. Processing unit 401 and main memory 402 may connect to each other directly or through a bus. System bus 403 connects processing unit 401 directly or indirectly to secondary storage 404, WAN interfaces 406-408 and LAN interface 405. Using system bus 403 allows network device 101a to have increased modularity. There is no limitation on the bus architecture for system bus 403 as long as it is able to allow different components to communicate with the processing unit. Secondary storage 404 stores program instructions for execution by processing unit 401. The scope of the invention is not limited to network devices 101a and 102a having three and two network interfaces, such that network devices 101a and 102a may have more network interfaces. The LAN interface and the WAN interfaces specified in FIG. 4A and FIG. 4B are only for illustrative purposes. Other components that may be utilized within network device 101a include board-level electronic components, media processors, and other specialized SoC or ASIC devices. Support for various processing layers and protocols (e.g., 802.3, DOCSIS MAC, DHCP, SNMP, H.323/RTP/RTCP, VoIP, SIP, etc.) may also be provided as required. In one example, at least one cellular modem is used for providing WAN connectivity. The at least one cellular modem may be coupled to processing unit 401 through a bus, such as bus 403. For example, a network interface of network device 101a could be realized by using a cellular modem.

Network devices 101a and 102a may be embodied as multi-WAN network devices that support aggregating the bandwidth of multiple WAN-to-WAN connections. Network devices 101a and 102a are connected via inter-connected network 100. Inter-connected network 100 is an inter-connected network that may comprise a metropolitan area network (MAN), WAN, wireless network, and the Internet.

Network device 101a is capable of connecting to access networks 111, and network device 102a is capable of connecting to access networks 112. Access networks 111 and 112 are the access networks for providing access to inter-connected networks 100. For illustrative purposes, network device 101a may comprise three WAN interfaces capable of connecting to three access networks 111a-c and network device 101b may comprise two WAN interfaces capable of connecting to two access networks 112a-b. However, these configurations may vary according to the desired network device and configuration. There is no restriction on the number of WAN interfaces of network devices 101a and 102a.

Access networks 111a-c and 112a-b may have similar or different latency and bandwidth capabilities. Further, access networks 111a-c and 112a-b may comprise the same or different types of connections, such as Ethernet cable, digital subscriber line (DSL), Transmission System 1 (T1), Wi-Fi, General Packet Radio Service (GPRS), Enhanced Data Rates for GSM Evolution (EDGE), Universal Mobile Telecommunications System (UMTS), LTE, 5G, satellite connections and the like.

For illustrative purposes, data packets may be sent and received between a host connected to network device 101a and another host connected to network device 102a. For illustrative purposes, the hosts connected to the network interface of network device 101a are desktop 101b and laptop 101c via connections 113 and 114 respectively, and the hosts connected to the network interface of network device 102a are server 102b and database server 102c via connections 115 and 116 respectively.

Figure 1B:
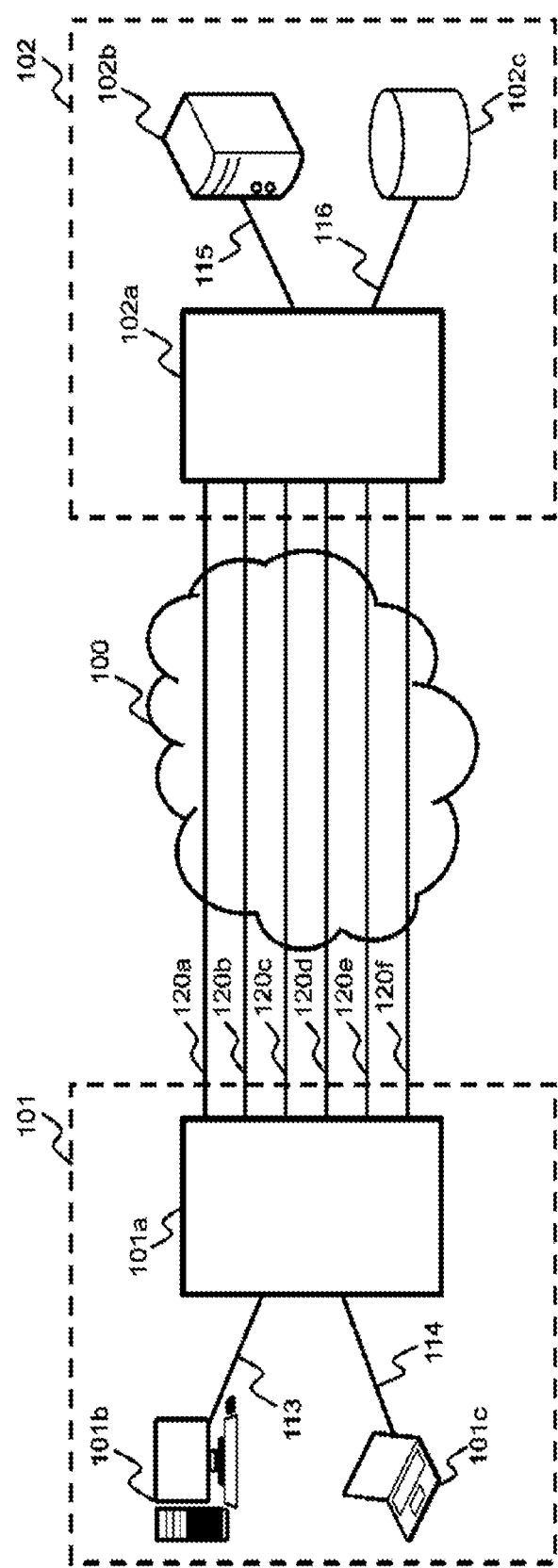

FIG. 1B illustrates the WAN-to-WAN connections established between two network devices according to the embodiments of the present invention. An end-to-end connection may be established between a host within the same LAN of network device 101a and a host within the same LAN of network device 102a. The WAN-to-WAN connection may be established via a network interface of the network device 101a and a network interface of the network device 102a. For example, six WAN-to-WAN connections 120a-f are established between network devices 101a and 102a.

Three network interfaces of network device 101a are capable of connecting to three access networks 111a-c, while two network interfaces of network device 102a are capable of connecting to two access networks 112a-b. Hence, six WAN-to-WAN connections may be created through access network 111a-c and 112a-b.

End-to-end connections established between desktop 102b and server 102b may establish via at least one of the six WAN-to-WAN connections.

In one example, WAN-to-WAN connections 120a-f are established through the network interfaces 111a-112b, 111a-112b, 111b-112a, 111b-112b, 111c-112a, and 111c-112b respectively.

Determining Initial Weightings

Figure 2C:
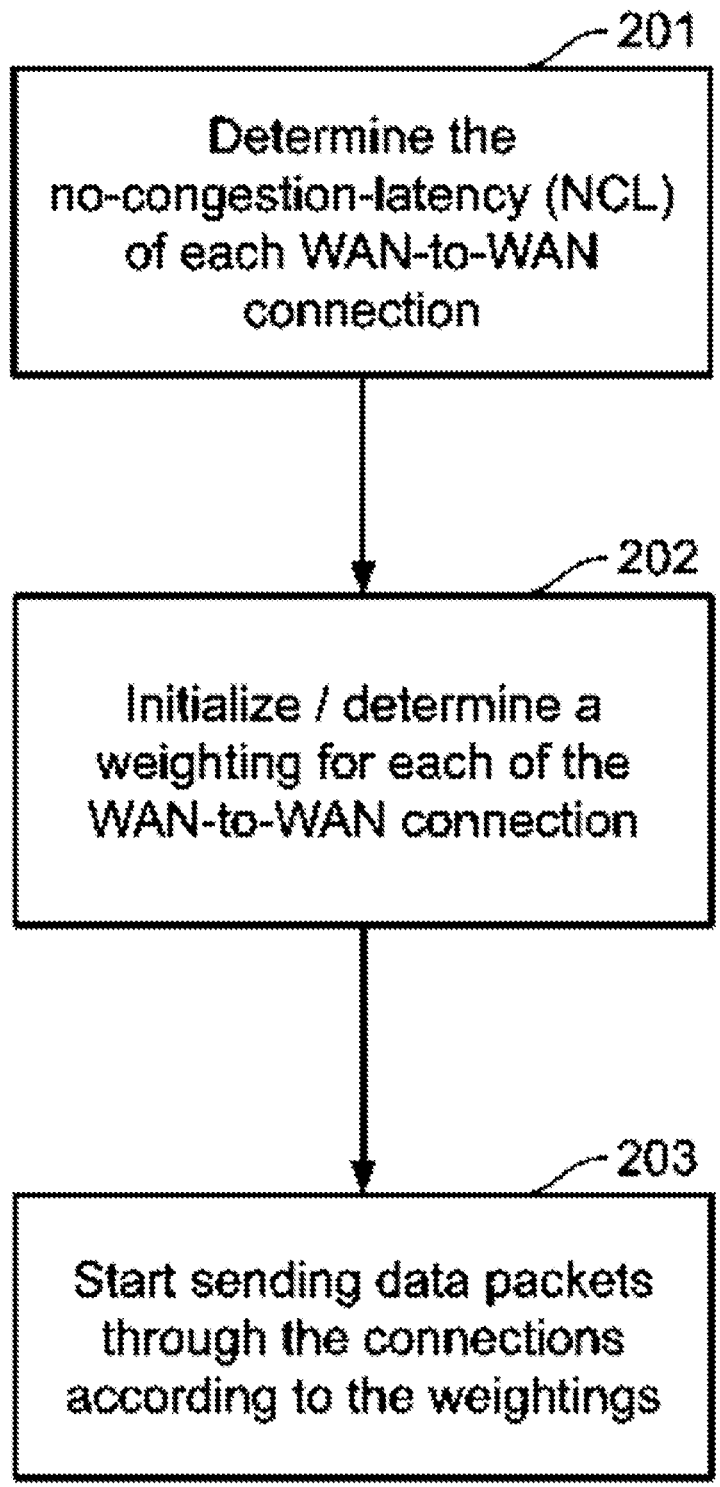
FIG. 2C is a flow diagram illustrating a method for assigning initial weightings to the WAN-to-WAN connections before sending the data packets through the plurality of WAN-to-WAN connections.

FIG. 2A illustrates a table storing the initial weightings of WAN-to-WAN connections 120a-f. FIG. 2A should be viewed in conjunction with FIG. 2C and FIG. 1B. In one example, initially, the processing unit of network device 101a sends data packets to network device 102a through WAN-to-WAN connections 120a-f with equal distribution. Therefore, the initial weightings of each of WAN-to-WAN connections 120a-f is assigned with the same weighting, one-hundred. There is no limitation that one-hundred must be used as the initial weighting. Other numbers may also be used as the default weighting.

There is also no limitation that the initial weightings must be the same for all WAN-to-WAN connections. However, it is preferred that the initial weightings are approximately the same for WAN-to-WAN connections 120a-f as usually there is no information about latency for WAN-to-WAN connections initially. If there is latency information available prior to assigning the weightings, the weightings should then be adjusted accordingly.

The higher the weighting a WAN-to-WAN connection has compared to other WAN-to-WAN connections, the more the WAN-to-WAN connection may be used by the processing unit of network device 101a to send data packets than through other WAN-to-WAN connections. Alternatively, it is possible to send more data packets through a WAN-to-WAN connection if the processing unit of network device 101a is configured to send more data packets through WAN-to-WAN connections that have lower weightings than WAN-to-WAN connections that have higher weightings.

Alternatively, the initial weightings are determined based on non-congested latency ("NCL") of each WAN-to-WAN connection. The lower a latency of a WAN-to-WAN connection, the higher the weighting of the WAN-to-WAN connection. As lower latency is preferable, the processing unit of network device 101a may try to utilize lower latency WAN-to-WAN connections more, higher weightings are assigned to these lower latency WAN-to-WAN connections. For example, the weighting of the lowest latency WAN-to-WAN connection may be assigned to be 200 while the weighting of the highest latency WAN-to-WAN connection may be assigned to be 40.

Determining Non-Congested-Latencies

FIG. 2B illustrates a table storing NCLs of WAN-to-WAN connections 120a-f. For illustration purposes, the NCLs of WAN-to-WAN connections 120a-f are estimated to be 100 ms, 200 ms, 130 ms, 50 ms, 400 ms and 70 ms respectively. During the estimation of NCLs, the number of data packets being sent from network device 101a to network device 102a and being sent from network device 102a to network device 101a should be so few that the data packets do not affect the NCL estimation. Otherwise, the NCL estimation may not be accurate as the data packets may congest a WAN-to-WAN connection and induce bufferbloat. In one example, no data packets are being sent or received and only latency estimation packets are being sent from network device 101a to network device 102a through each of WAN-to-WAN connections 120a-f. When network device 102a receives a latency estimation packet at a WAN-to-WAN connection, network device 102a replies with an acknowledgment. The acknowledgment is a packet sent from network device 102a to network device 101a and may store and embedded information. When network device 101a receives the acknowledgment, the processing unit of network device 101a is then able to estimate the round-trip latency of the WAN-to-WAN connection. Alternatively, the processing unit of network device 101a uses a ping test on each of WAN-to-WAN connections 120a-f to estimate respective latencies of each of WAN-to-WAN connections 120a-f.

In one alternative example, when network device 101a sends latency estimation packets to network device 102a through WAN-to-WAN connections 120a-f, network device 101a embeds a timestamp in each of the latency estimation packet. When network device 102a receives a latency estimation packet from a WAN-to-WAN connection, the processing unit of network device 102a compares its clock against the timestamp to estimate the amount of time the latency estimation packet takes to reach network device 102a through the WAN-to-WAN connection. The amount of time is the latency. The processing unit of network device 102a then embeds the latency in the acknowledgment. When network device 101a receives the acknowledgment, the processing unit of network device 101a retrieves the latency estimated by the processing unit of network device 102a from the acknowledgment. The latency retrieved is the NCL estimation of the WAN-to-WAN connection. In one variant, the processing unit of network device 102a does not compare its clock against the timestamp, but instead stores the timestamp from network device 101a and a timestamp of network device 102a in the acknowledgment. When the processing unit of network device 101a receives the acknowledgment, it can compare the two timestamps to estimate the latency and NCL of the WAN-to-WAN connection.

FIG. 2C is a flowchart that illustrates a method for assigning a weighting to each of the plurality of WAN-to-WAN connections. It should be appreciated that the particular functionality, the order of the functionality, etc. provided in FIG. 2A is intended to be exemplary of operation in accordance with the concepts of the present invention. Accordingly, the concepts herein may be implemented in various ways differing from that of the illustrated embodiment.

FIG. 2C should be viewed in conjunction with FIG. 1B. At process 201, the processing unit of network device 101 estimates respective NCL of each of WAN-to-WAN connections 120a-f. At process 202, the processing unit of network device 101 initializes a weighting for each of WAN-to-WAN connections 120a-f according to the NCL. For example, the higher the NCL, the lower the weighting is and the lower the NCL, the higher the weighting is. This allows WAN-to-WAN connection that has lower NCL to be used for sending more data packets. For illustration purposes, the weighting of each of WAN-to-WAN connections 120a-f is illustrated in FIG. 2G.

At process 203, the processing unit of network device 101a sends the data packets according to the table storing the initial weightings. For illustration purposes, the processing unit of network device 101a uses the weighting illustrated in FIG. 2G. The sum of all the weightings is 480, based on the weightings of WAN-to-WAN connections 120a-f, 50, 100, 50, 120, 60, and 100 respectively. Therefore, the processing unit of network device 101a sends about 10.4% (50/480), 20.8% (100/480), 10.4% (50/480), 25% (120/480), 12.5% (60/480) and 20.8% (100/480) of data packets via WAN-to-WAN connections 120a-f respectively.

There is no limitation that the initial weightings must be the weightings illustrated in FIG. 2G or must be determined based on NCLs. For example, one default value may be used as the initial weightings illustrated in FIG. 2A, such that the processing unit of network device 101 sends about one-sixth of data packets via each of WAN-to-WAN connections 120a-f respectively in process 203.

Changing Latency

The latency of a WAN-to-WAN connection may change or fluctuate due to many factors. One of the factors is bufferbloat. Bufferbloat may occur in wired and wireless networks, including cellular networks. Bufferbloatt usually occurs when the data packets could not reach the destination fast enough and cause congestion. It is known that cellular network operators usually deploy large queues to store data packets. The large queues may create bufferbloat. When bufferbloat occurs, latency will increase. One of the techniques to prevent bufferbloat from happening is to reduce the number of data packets sent via a WAN-to-WAN connection. When there are fewer data packets, the cellular network operator may not store the data packets in the queue and latency may return to NCL. Therefore, it is desired to send fewer data packets via a WAN-to-WAN connection when the current latency is higher than NCL.

FIG. 2D illustrates a table of latency estimated, over 1500 ms, of WAN-to-WAN connections 120a-f. For example, the NCLs initially estimated at t=0 ms is 100 ms, 200 ms, 130 ms, 50 ms, 300 ms, and 70 ms respectively for WAN-to- WAN connections 120*a*, 120*b*, 120*c*, 120*d*, 120*e*, and 120*f*. After 1000 ms, at t=1000 ms, the latencies estimated become 100 ms, 250 ms, 200 ms, 60 ms, 600 ms and 300 ms respectively for WAN-to-WAN connections 120*a*, 120*b*, 120*c*, 120*d*, 120*e*, and 120*f*. The latencies of WAN-to-WAN connections 120*b*, 120*c*, 120*d*, 120*e* and 120*f* have worsened. This probably indicates WAN-to-WAN connections 120*b*, 120*c*, 120*d*, 120*e* and 120*f* are congested and bufferbloat may appear in these WAN-to-WAN connections. Particularly, latencies of WAN-to-WAN connections 120*c*, 120*e* and 120*f* have worsened for more than 30%. The latency of WAN-to-WAN connections 120*c* has increased by nearly 53% from 130 ms to 200 ms. The latency of WAN-to-WAN connections 120*e* has increased by 100% from 300 ms to 600 ms. The latency of WAN-to-WAN connections 120*f* has increased by nearly 328% from 70 ms to 300 ms.

FIG. 2E illustrates a table of weightings for each of WAN-to-WAN connections 120*a-f* over 1500 ms based on the latencies estimated in FIG. 2D. The processing unit of network device 101*a* may decrease the weighting of a WAN-to-WAN connection if the latency of the WAN-to-WAN connection has increased more than a threshold, for example 30%. The weighting of WAN-to-WAN connection 120*a* remains the same as the latency estimated for WAN-to-WAN connection 120*a* remains the same. The weighting of WAN-to-WAN connection 120*b* remains to be 100 during the time of t=0 ms to t=1000 ms as the latency estimated for WAN-to-WAN connection 120*b* has increased less than 30% of the NCL at that time. However, the weighting of WAN-to-WAN connection 120*b* decreases from 100 to 60 during the time of t=1000 ms to t=1500 ms as the latency estimated for WAN-to-WAN connection 120*b* has increased more than 30% of the NCL at t=1500 ms. The weighting of WAN-to-WAN connection 120*c* decreases from 100 to 80 as the latency estimated for WAN-to-WAN connection 120*c* has increased more than 30%. The weighting of WAN-to-WAN connection 120*d* remains to be 100 as the latency estimated for WAN-to-WAN connection 120*d* has increased less than 30%. The weighting of WAN-to-WAN connection 120*e* decreases from 100 to 30 as the latency estimated for WAN-to-WAN connection 120*e* has increased significantly more than 30%. The weighting of WAN-to-WAN connection 120*f* decreases from 100 to 40 as the latency estimated for WAN-to-WAN connection 120*f* has increased significantly more than 30%.

It is possible latency estimated may be lower than NCL. In such cases, the NCL may be updated to new latency estimates. In one variant, NCL is not updated.

In one detailed example of updating weightings, when a weighting of a particular WAN-to-WAN connection has decreased, the weighting will not be increased again even when the latency of this particular WAN-to-WAN connection has decreased. This may simplify the implementation of updating weightings. When latencies of other WAN-to-WAN connections increase due to more data packets being sent through them, weightings of these WAN-to-WAN connections will decrease accordingly. Then the percentage of data packets being sent through this particular WAN-to-WAN connection will increase as the percentage of data packets being sent through other WAN-to-WAN connections decrease. For example, when the latency of WAN-to-WAN connection 120*f* has improved from 300 ms to 70 ms during the time of t=1000 ms to t=1500 ms illustrated in FIG. 2D, the weighting of WAN-to-WAN connection 120*f* remains at 40 as illustrated in FIG. 2E.

Alternatively, in another detailed example of updating weightings, when a weighting of a particular WAN-to-WAN connection has decreased, the weighting may be increased again when the latency of this particular WAN-to-WAN connection has decreased. Then the percentage of data packets being sent through this particular WAN-to-WAN connection will increase if the sum of weightings of other WAN-to-WAN connections does not increase. For example, when the latency of WAN-to-WAN connection 120*f* has improved from 300 ms to 70 ms during the time of t=1000 ms to t=1500 ms illustrated in FIG. 2D, the weighting of WAN-to-WAN connection 120*f* increased from 40 to 100 as illustrated in FIG. 2F.

Weightings Update Frequency

Weightings of WAN-to-WAN connections may be updated after different time intervals. Although latency may change every millisecond, it is preferred not to update the weightings of WAN-to-WAN connections too frequently as this may consume large amounts of computing resources. For example, the weightings may be updated every 50 ms, 500 ms, 4 seconds or 30 seconds. There is no limit that weightings may be updated every certain seconds. It is preferred to have weightings be updated more frequently soon after WAN-to-WAN connections are established than after WAN-to-WAN connections have been established after a period.

In one example, weightings may be first updated every 10 ms during the first 500 ms after NCLs are estimated and then every 60 ms. There is no limit that the weighting of each of the WAN-to-WAN connections must be updated at the same time. There is also no limit that each of the WAN-to-WAN connections must be updated using the same time interval. In one example, the weighting of WAN-to-WAN connections that have larger latency variance is updated more frequently than WAN-to-WAN connections that have small latency variance.

In another example, weightings and NCLs may be reset after a first period of time. For example, NCLs of the WAN-to-WAN connections will be estimated every 5 minutes. Then weightings of the WAN-to-WAN connections are reset to the same value. Then weighting of the WAN-to-WAN connection will be updated according to the changing latency of the WAN-to-WAN connection.

Figure 3A:
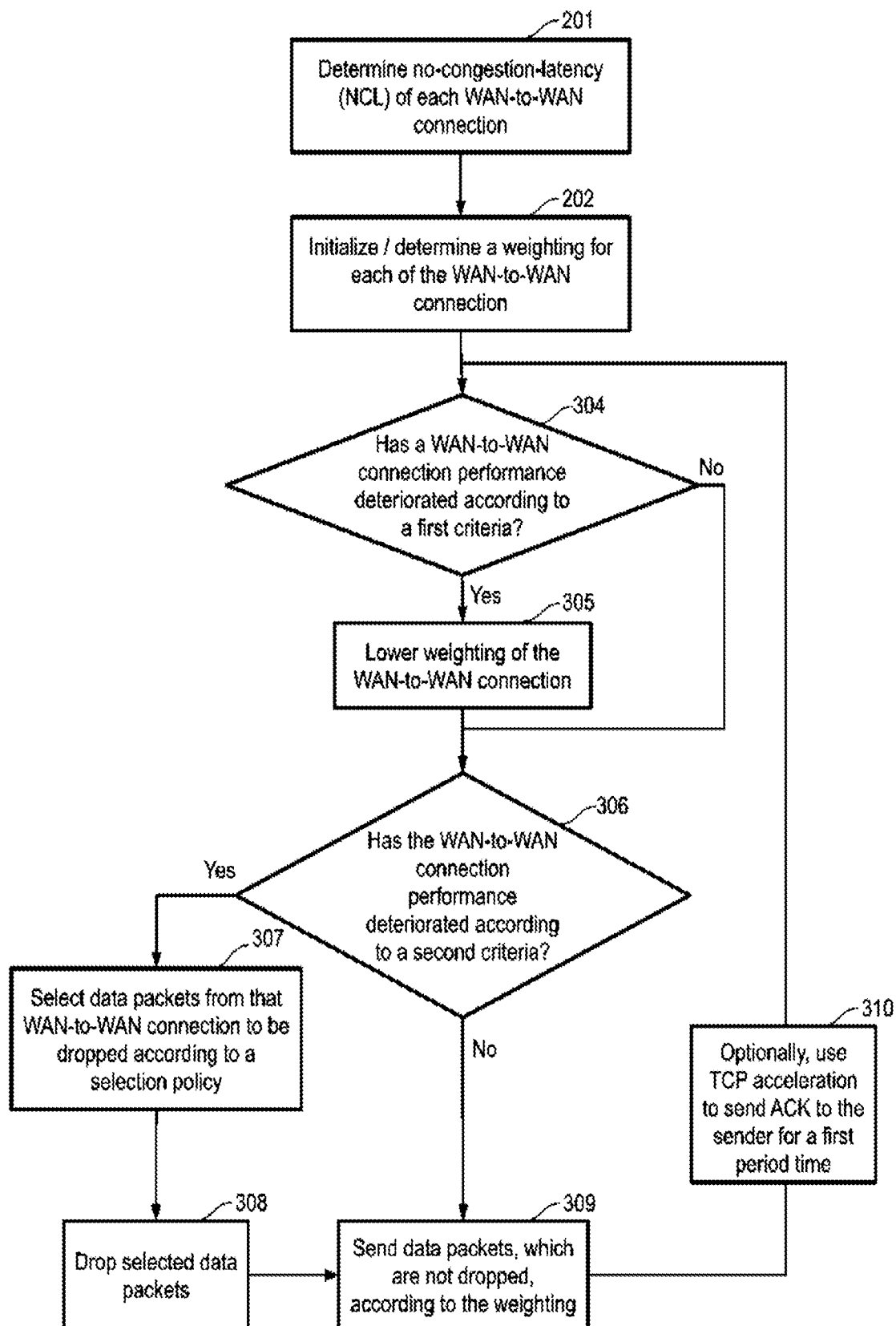
FIG. 3A is a flow diagram illustrating a method for changing the weighting while sending data packets according to the embodiments of the present invention.

The weightings update frequency is illustrated in processes 304 and 305 of FIG. 3A, and processes 904 and 905 of FIG. 9, which will be discussed in detail later.

Dropping Data Packet

When the processing unit of network device 101*a* notices that latency of a WAN-to-WAN connection has increased, in addition to lower weightings of the WAN-to-WAN connection, the processing unit of network device 101*a* may drop data packets from the queue of the WAN-to-WAN connection. Dropping data packets may adversely affect the operation of applications and/or hosts. However, the present invention selects to allow the applications and/or hosts to remedy the dropped data packets themselves. This is possible that when data packets are delayed due to large latency and/or bufferbloat, applications and/or hosts transmitting these data packets may retransmit the data packets, ignore the delay or report the delay. Dropping data packets may release network resources.

Figure 6:
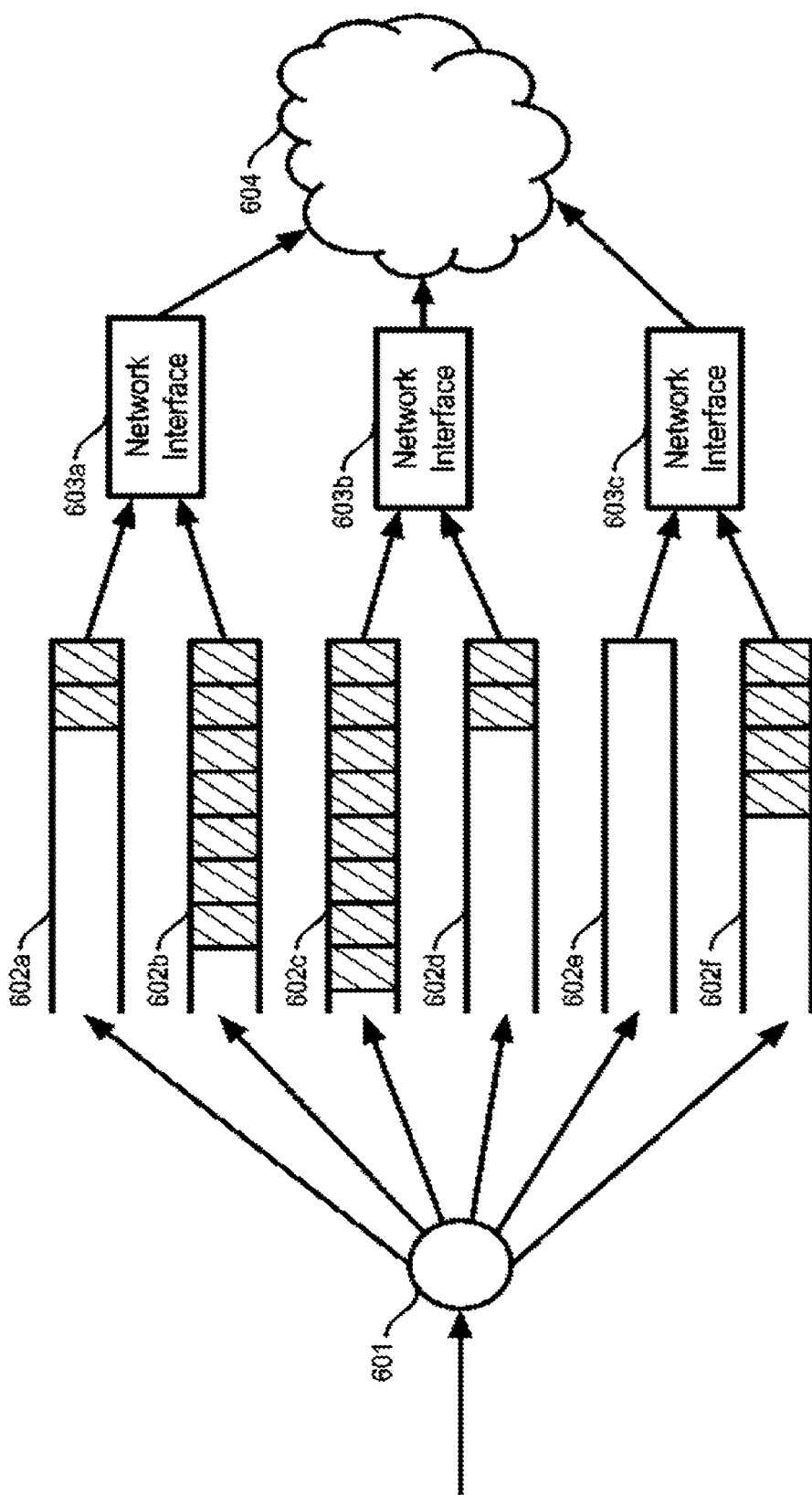
FIG. 6 is a block diagram illustrating how network device queue data packets for the WAN-to-WAN connections according to the embodiments of the present invention.

FIG. 6 illustrates a block diagram of how network device 101*a* queue data packets for the WAN-to-WAN connections. When the processing unit of network device 101*a* receives a data packet, a module of the processing unit, i.e. module 601, will first select a WAN-to-WAN connection based on the weightings and other policies, such as outbound policy and firewall policies. Then the processing unit of network device 101*a* will store the data packet in the queue of the selected WAN-to-WAN connection. For illustration purposes, queues 602a, 602b, 602c, 602d, 602e, and 602f shown in FIG. 6 are queues of WAN-to-WAN connections 120a, 120b, 120c, 120d, 120e, and 120f shown in FIG. 1B respectively. A shaded rectangle illustrates a data packet stored. For example, there are two data packets stored in queue 602a and there are no data packets stored in queue 602e. In another example, queue 602c is almost full.

For illustration purposes, there are two WAN-to-WAN connections established using each network interface of network device 101a. For illustration purposes, network interface 603a, 603b and 603c shown in FIG. 6 may be implemented using network interface 406, 407 and 408 shown in FIG. 4A respectively. Data packets from queue 602a and 602b are sent via network interface 603a. Data packets from queue 602c and 602d are sent via network interface 603b. Data packets from queue 602e and 602f are sent via network interface 603c. When the processing unit of network device 101a decides to drop a data packet from a queue, the data will then be removed from the queue and will not be sent via the corresponding network interface.

A queue may be stored at one or more volatile or non-volatile storage units. For example, the queue may be stored in DRAM, SRAM, Flash, hard disk, optical disk, cache of the processing unit.

There are myriad configurations for the processing unit of network device 101a to determine when to start dropping data packets and when to stop dropping data packets. In one embodiment illustrated by FIG. 3A, data packets are selected and may be dropped. NCLs are estimated at process 201. Initial weightings are determined at process 202. Then the processing unit of network device 101a performs process 304 to determine if a WAN-to-WAN connection performance has deteriorated according to a first criteria.

The first criteria may be latency has increased more than a threshold. The first criteria may also be a particular number of data packet drops within a particular period of time. The first criteria may also be signal-to-noise ratio (SNR) of a wireless connection used by a WAN-to-WAN connection worse than a particular decibel. As a network interface may be used by a plurality of WAN-to-WAN connections and a wireless connection established using a wireless modem may be used as a network interface, the SNR of the wireless connection may affect network performance, including latency, of a WAN-to-WAN connection. Further, as SNR of the wireless connection may fluctuate over time and at different locations, the latency of the WAN-to-WAN connection may change significantly in a short period of time. Improving SNR may imply improving latency while worsening SNR may imply worsening latency. Therefore, the weighting of a WAN-to-WAN connection may be affected by the SNR of the wireless connection.

The first criteria may also further include a timing factor that the first criteria is valid for a period of time. For example, the first criteria is valid for 5 seconds after process 202 or after weightings have been updated at process 305. There is no limitation that the first criteria must be valid for 5 seconds. It could be 1 second, 20 seconds, 5 minutes or 1 hour. Process 304 may also be performed regularly. For example, the processing unit of network device 101a may only detect whether a WAN-to-WAN connection performance, such as latency, deteriorates every 50 ms, 500 ms, 4 seconds or 30 seconds.

In process 306, the processing unit determines if a WAN-to-WAN connection deteriorates according to a second criteria. The second criteria may be the same as or different from the first criteria. In one example, the second criteria is valid when latency has increased more than a particular percentage of the NCL of a WAN-to-WAN connection, process 307 may then be performed. If the latency has increased less than the particular percentage, process 309 may then be performed. The second criteria may also further include a timing factor that the second criteria is valid for a period of time. For example, the second criteria is valid for 200 ms after latency was last estimated. Therefore, data packet drops at process 308 will not be performed more frequently than every 200 ms. There is no limitation that the second criteria must be valid for 5 seconds. There is also no limitation that the second criteria is restricted to latency. The second criteria may also include network performance, location, and time of a day.

Data packets are first selected at process 307 from the queue of the WAN-to-WAN connection that satisfy the second criteria, and then dropped or removed from the queue at process 308. The data packets may be selected randomly or according to a selection policy. For example, the data packets may be selected based on first-in-first-out (FIFO) or last-in-first-out (LIFO). In another example, data packets that have the largest payload are dropped first. In another example, data packets that have the smallest payload are dropped first. In another example, data packets that are destined for a particular data destination are dropped first. Data packets will continue to be dropped until the second criteria is not satisfied anymore.

In one example, all data packets that are queued for a WAN-to-WAN connection are dropped. For example, all data packets in queue 602c may be dropped. There will be no data packets being allowed to be sent through WAN-to-WAN connection 120c until WAN-to-WAN connection 120c do not satisfy the second criteria any more. In one variant, only a fixed percentage, for example eighty percent, of data packets are dropped.

In one variation, the second criteria is valid if the latencies of all WAN-to-WAN connections have increased more than a particular percentage than the NCLs. FIG. 3B is a table illustrating latency estimated for WAN-to-WAN connections 120a-f during the time period from t=0 ms to t=3000 ms. FIG. 3B should be viewed in conjunction with FIG. 1B and FIG. 6. For illustration purposes, the particular percentage is 55%. When at t=0 ms, NCLs are estimated that the NCLs of WAN-to-WAN connections 120a-f are 100 ms, 200 ms, 130 ms, 50 ms, 300 ms and 70 ms respectively. Then at t=2000 ms, latencies of all WAN-to-WAN connections have worsened more than 100%, which is more than 55%, therefore, process 307 is performed. As a result, data packets are dropped from queues 602a-602f at process 308. For illustration purposes, data packets are dropped from each of queues 602a-602f. When at t=3000 ms, latencies of WAN-to-WAN connections 120a-f have improved and have not increased more than 55% than the NCLs. The second criteria is no longer satisfied, therefore, there will be no more data packets dropped and process 307 will not then be performed.

In one variation, the second criteria is valid if the latencies of at least half of all WAN-to-WAN connections have increased more than a particular percentage than the NCLs. At process 307, the processing unit of network node 101a selects data packets from the queues of the WAN-to-WAN connections that have increased more than the particular percentage than the NCLs. Data packets are dropped from the queues at process 308. If a latency of a WAN-to-WAN connection has not increased more than a particular percentage than the NCL, process 307 will not be performed for that WAN-to-WAN connection.

At process 309, the data packets are retrieved from the queues and are sent through WAN-to-WAN connections 120a-f according to the weightings of the WAN-to-WAN connections 120a-f.

In one variance, after process 305 is performed, data packets are stored at the queues of WAN-to-WAN connections 120a-f. For example, WAN-to-WAN connections that have higher weightings will have more data packets being stored at the corresponding queues than the queues of WAN-to-WAN connections that have lower weightings. Using FIG. 2F as an illustration, the processing unit of network device 101a will store more data packets at the queue of WAN-to-WAN connection 120a than at the queue of WAN-to-WAN connection 120e because the weighting of WAN-to-WAN connection 120a is more than the weighting of WAN-to-WAN connection 120e.

TCP Accelerator

Optionally, in case the data packets are transmission control protocol (TCP) packets and are originally sent by host 101b and/or host 101c, the processing unit of network node 101a may perform TCP acceleration. The processing unit of network device 101a may create and send TCP acknowledgments to the hosts which send the data packets to network node 101a at process 310 after data packets are sent at process 309. The TCP acknowledgments correspond to the data packets sent at process 310.

TCP acceleration may be applicable to both network devices 101a and 102a to perform. For illustration purposes, TCP acceleration is only applied to network device 101a in FIG. 5A, FIG. 5B and FIG. 5C for illustrative purposes. A TCP accelerator may be a hardware TCP accelerator or the software TCP accelerator.

In one example, to accelerate the data packet transmission, when receiving a data packet from desktop 101b, network device 101a may send an acknowledge message (ACK) to desktop 101b for a first period of time before receiving ACK from server 102b through network device 102a. Hence, another data packet may be sent from desktop 101b to network device 101a to improve the overall network flow performance.

Figure 5A:
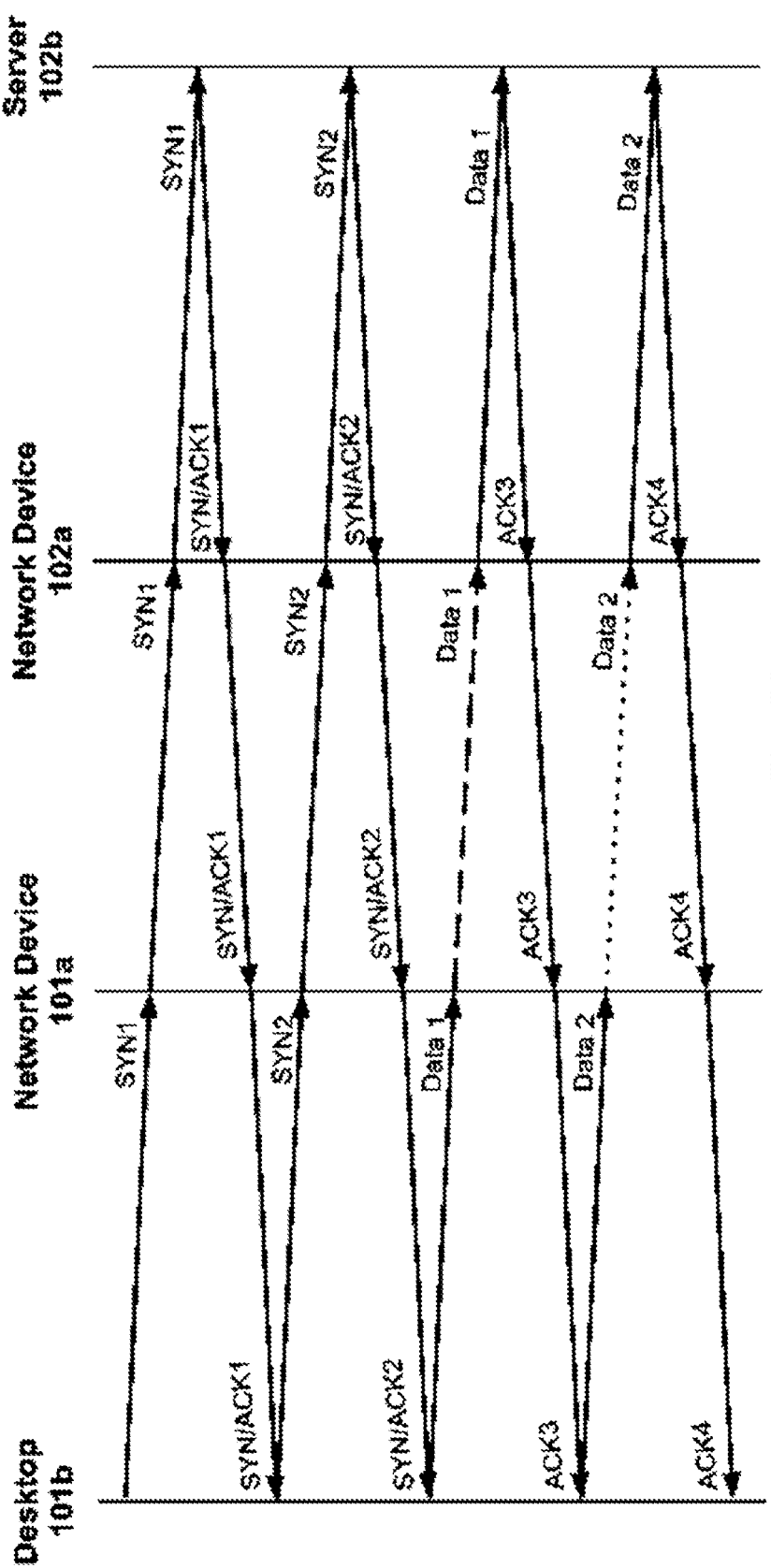
FIG. 5A is a timing diagram that illustrates the data packet transmission without TCP acceleration.
Figure 5B:
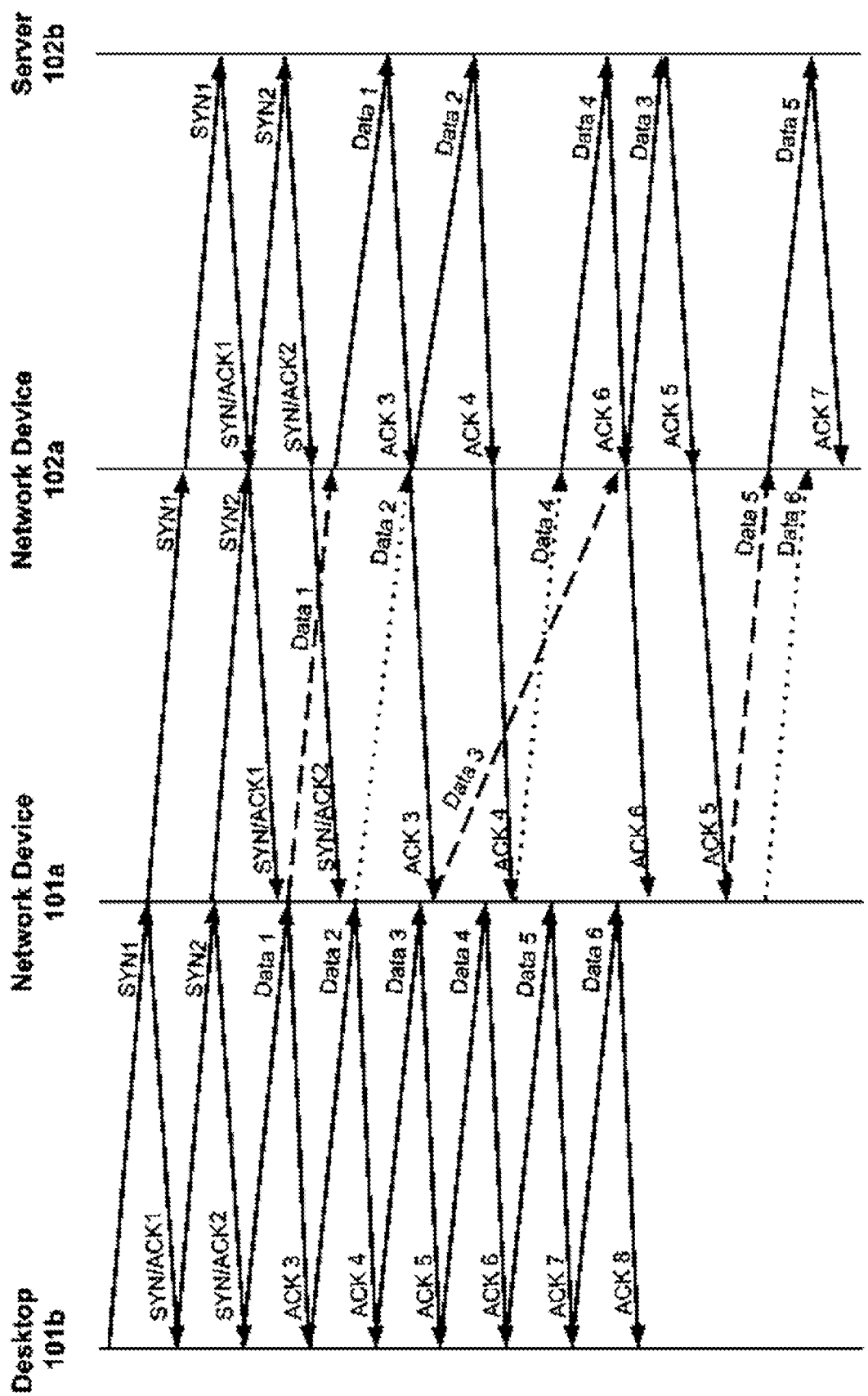
FIG. 5B is a timing diagram that illustrates the data packet transmission with TCP acceleration.
Figure 5C:
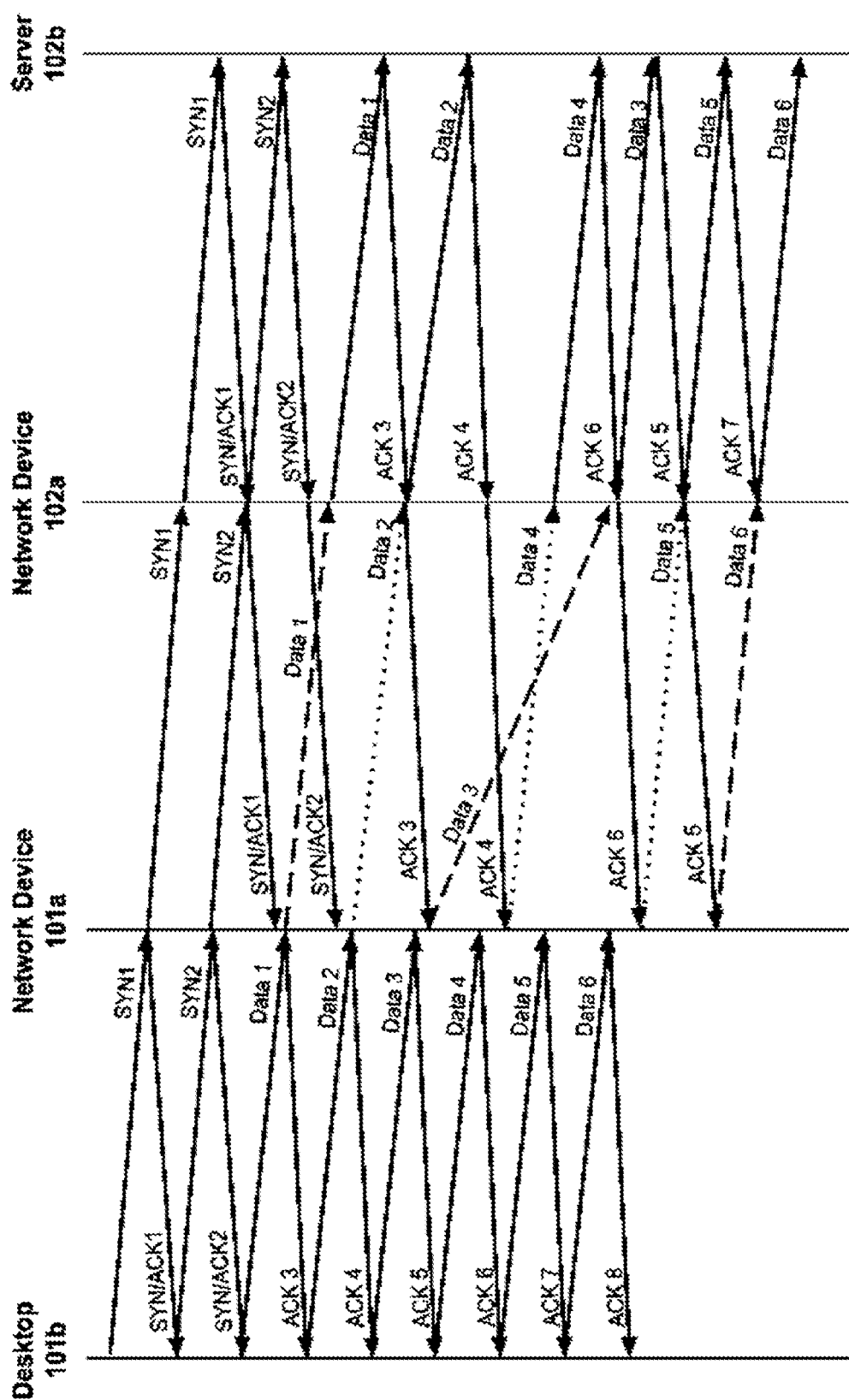
FIG. 5C is a timing diagram that illustrates the data packet transmission with TCP acceleration according to the embodiments of the present invention.

For simplification, differing from FIG. 1B, only WAN-to-WAN connections 120a and 120b are established between network devices 101a and 102a for illustrative purposes in FIG. 5A, FIG. 5B and FIG. 5C. Data packets are distributed to the plurality of WAN-to-WAN connections according to the algorithm. For illustrative purposes, Data 1, Data 2, Data 3, Data 4, Data 5 and Data 6 are the data packets sent from desktop 101b to server 102b through network devices 101a and 102b. For illustrative purposes, round-robin is applied for distributing data packets. There is no limitation on which algorithm is applied for distributing data packets.

Dot line and dash line are used to indicate two different WAN-to-WAN connections selected for a particular data packet sent to server 102b. For example, data packets, such as Data 1, sent through WAN-to-WAN connection 120a are represented by a dashed line. Data packets, such as Data 2, sent through WAN-to-WAN connection 120b are represented by a dotted line.

FIG. 5A is a timing diagram that illustrates data packet transmission without TCP acceleration. Data packets are sent from desktop 101b to server 102b through network devices 101a and 102b. Handshake is performed for establishing a WAN-to-WAN connection. Sending of SYN1 and SYN2 between desktop 101b and network device 101a, sending SYN/ACK1 between network device 101a and network device 102a, and sending SYN/ACK2 between network device 102a and Server 102b are for handshake purposes. After the handshake is completed, WAN-to-WAN connections 120a and 120b are established. Data packets are sent from desktop 101b to server 102b one-by-one through WAN-to-WAN connection 120a or 120b and network device 102a. An ACK is received from server 102b by network device 101a for each data packet successfully received by server 102b through network device 102a and one of WAN-to-WAN connection 120a or 120b. The data packets that originate from desktop 101b are buffered at network device 102a, which is responsible for performing local retransmissions in the event of data packet loss. Server 102b sends an ACK back to desktop 101b only if the data packet, such as Data 1, is received from server 102b through network device 102a. The pattern of sending Data 1 and Data 2 in the timing diagram is repeated for the remaining data packets, such as Data 3, Data 4, Data 5 and Data 6.

FIG. 5B is a timing diagram that illustrates the data packets transmission with TCP acceleration. Handshakes are performed for establishing WAN-to-WAN connections as illustrated in FIG. 5A. Two WAN-to-WAN connections, such as WAN-to-WAN connections 120a and 120b, are established. Another WAN-to-WAN connection, such as WAN-to-WAN connection 120c, is established when an end-to-end connection is established between desktop 101b and server 102b.

To accelerate the process of sending data packets, network device 101a not only acknowledges the SYN at once, but also the data packets, such as Data 1, Data 2 . . . Data 6 shown in FIG. 5B. As illustrated in FIG. 5B, assuming that the queue or the buffer of the TCP accelerator in network device 101a is large enough, network device 101a is able to receive data packets from desktop 101b continuously. However, in some situations, the overall performance of the plurality of WAN-to-WAN connections cannot benefit from the TCP accelerator if the algorithm of distributing data packets is not based on latency-related weightings. For illustrative purposes, round-robin is applied here.

When data packets are received by network device 101a, network device 101a determines if there are at least two available WAN-to-WAN connections. If there are at least two WAN-to-WAN connections available, the data packets are distributed to the WAN-to-WAN connections according to the algorithm and the weighting. If there is only an available WAN-to-WAN connection, the data packets are sent directly. In one variant, the WAN-to-WAN connection may not be available for sending data packets if the queue of that WAN-to-WAN connection is full or nearly full. In another variant, the WAN-to-WAN connection is not available if the performance of that WAN-to-WAN connection has deteriorated and continuously satisfying the second criteria as described before.

Data packets are distributed according to the algorithm and transmitted through the WAN-to-WAN connections if there are more than one available WAN-to-WAN connections. For illustrative purposes, round-robin is applied for distributing data packets. For example, a packet is distributed to each of the plurality of WAN-to-WAN connections at a time if the round-robin is applied. For example, Data 1 is sent through WAN-to-WAN connection 120a. Since data packets are distributed according to the round-robin algorithm, Data 2 is sent through WAN-to-WAN connection 120b subsequently. After that, Data 3 may be sent through WAN-to-WAN connection 120a after a respective ACK is received by network device 101a, and Data 4 may be sent through WAN-to-WAN connection 120b after a respective ACK is received by network device 101a.

It is possible that the performance of one or more WAN-to-WAN connections become worse while sending data packets. For illustrative purposes, only WAN-to-WAN connection 120a is congested while sending data packets. When sending Data 3 through WAN-to-WAN connection 120a, it requires more time for sending Data 3. Hence, the latency of WAN-to-WAN connection 120a may then increase and WAN-to-WAN connection 120a becomes congested.

Network device 101a may receive ACK 5 after ACK 6 is received if both WAN-to-WAN connections 120a and 120b are available. At this time, WAN-to-WAN connection 120a is occupied by Data 3, and WAN-to-WAN connection 120b is ready. WAN-to-WAN connection 120a is ready only if ACK 5 is received. Since only round-robin is applied, when WAN-to-WAN connection 120b is ready, the next packet may only be sent if WAN-to-WAN connection 120a is ready. Hence, network device 101a is awaiting for another time and cannot send Data 5 to network device 102a until WAN-to-WAN connection 120a is ready.

To improve the network performance, the present invention is to make use of the ready WAN-to-WAN connection to send the data packets.

FIG. 5C is a timing diagram that illustrates a method for improving the network performance among the plurality of WAN-to-WAN connections while sending data packets according to the embodiments of the present invention. For illustrative purposes, different from FIG. 5B, weighted round-robin is applied here to compare with the round-robin used before. The weighting is based on the latency of a plurality of WAN-to-WAN connections. For illustrative purposes, two WAN-to-WAN connections are established.

Assuming that the weightings of two WAN-to-WAN connections established between network devices 101a and 102a are the same, the same amount of data packets are distributed to two WAN-to-WAN connections. For example, if the weighted round-robin is applied to two WAN-to-WAN connections, a first packet is distributed to a first WAN-to-WAN connection and the second packet is distributed to the second WAN-to-WAN connection.

The weightings of the plurality of WAN-to-WAN connections are changed according to the present invention. The weightings may be changed by applying the method illustrated in FIG. 3A. If a WAN-to-WAN connection is congested, the latency of that WAN-to-WAN connection is increased, and the weighting of that WAN-to-WAN connection is decreased. If the weightings of the other WAN-to-WAN connections are not changed, fewer data packets are distributed to the congested WAN-to-WAN connection compared with other WAN-to-WAN connections. For example, network device 101a determines that the weighting of WAN-to-WAN connection 120b is unchanged while WAN-to-WAN connection 120a is congested. Hence, the weighting of WAN-to-WAN connection 120a is decreased, such as decreased from 100 to 50, and fewer data packets are distributed to WAN-to-WAN connection 120a.

After the ACKs of Data 1 and Data 2 are received, Data 3 and Data 4 are being sent from network device 101a to network device 102a. Network device 101a is waiting for the ACKs of Data 3 and Data 4 from server 102b.

If weighted round-robin is applied, the number of data packets distributed to WAN-to-WAN connections 120a and 120b may be changed. As described above, the weighting of WAN-to-WAN connection 120b is unchanged, such as 100. Since WAN-to-WAN connection 120a is congested, the weighting of WAN-to-WAN connection 120a is decreased, such as from 100 to 50.

Hence, the ratio of the number of data packets distributed to WAN-to-WAN connection 120a and WAN-to-WAN connection 120b is 1:2. When ACK 6 is received by network device 101a, which means Data 4 is sent successfully. Different from FIG. 5B, network device 101a may use WAN-to-WAN connection 120b to send Data 5 rather than waiting for WAN-to-WAN connection 120a ready.

When ACK 5 is received by network device 101a, which means Data 3 is sent successfully. Since Data 4 and Data 5 are sent through WAN-to-WAN connection 120b, according to the weighted round-robin algorithm, the next packet, Data 6, may send through WAN-to-WAN connection 120a according to the updated weighting of each of the plurality of WAN-to-WAN connections.

In another embodiment, the data packets distributed to the plurality of WAN-to-WAN connections are based on the updated weightings after a period. For example, if both of the previous weightings of WAN-to-WAN connections 120a and 120b are 10, and the updated weightings of WAN-to-WAN connections 120a and 120b are 5 and 10 respectively. Data 4 may be sent according to the previous weightings even if the weightings are changed. The updated weightings may be applied to Data 5 and the upcoming data packets.

There is no limitation on when the data packets are distributed based on the updated weightings. The above embodiments are for illustrative purposes only.

Aggregated Connection

In one of the embodiments, at least two WAN-to-WAN connections may be aggregated to form an aggregated WAN-to-WAN connection. In view of FIG. 1B, for example, WAN-to-WAN connections 120a and 120b are aggregated to form an aggregated WAN-to-WAN connection. The data packets may be sent through an aggregated WAN-to-WAN connection or a WAN-to-WAN connection based on the user preference. For example, the data packets may be sent based on one or more of the following: address of source traffic, such as IP address, IP address range and Ethernet address; one or more domain names of traffic destination; protocol, such as transmission control protocol, user datagram protocol, and port number; and algorithm, such as weighted balance, least used, and lowest latency and priority.

If there is no user preference specified, the data packets are sent based on the weightings of the aggregated WAN-to-WAN connection and/or the plurality of WAN-to-WAN connections. For example, two WAN-to-WAN connections 120a and 120b are established between network devices 101a and 102a. WAN-to-WAN connections 120a and 120b are aggregated to form an aggregated WAN-to-WAN connection. Data packets that are sent through the aggregated WAN-to-WAN connection may then be sent through the two WAN-to-WAN connections according to the weightings of two WAN-to-WAN connections. In one variant, the weighting of the aggregated WAN-to-WAN connection may be calculated by the average weighting of WAN-to-WAN connections 120a and 120b.

Weightings of WAN Interfaces

Figure 7:
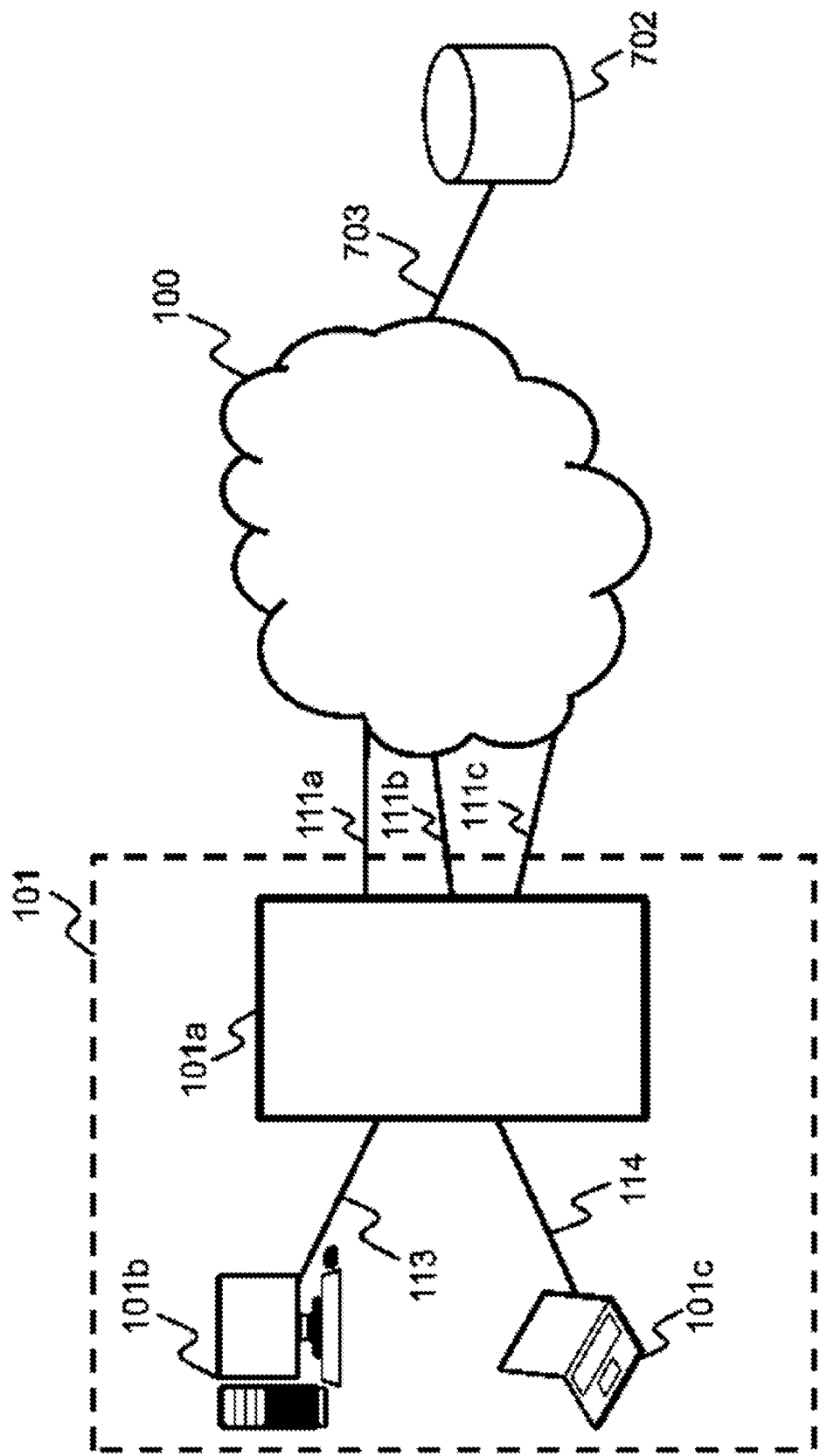
FIG. 7 illustrates a system adapted according to embodiments of the present invention.

FIG. 7 illustrates a system adapted according to embodiments of the present invention. The system includes site 101 and an evaluation server, such as evaluation server 702. Evaluation server is reachable through access network 703. Comparing to embodiments illustrated by FIG. 1A, network device 101a assigns weightings to WAN interfaces, instead of WAN-to-WAN connections. For illustration purposes only, there are three access networks 111a-c connecting to WAN interfaces 406-408 of network node 101a respectively. The processing unit of network device 101a sends evaluation packets to evaluation server 702 through the WAN interfaces 406-408 to estimate NCLs of WAN interfaces 406-408. The processing unit of network device 101a may then estimate latencies based on the round-trip time of the evaluation packets or based on the acknowledgements to the evaluation packets sent by evaluation server 702. FIG. 8B illustrates a table of estimated NCL of WAN interfaces 406-408.

Techniques discussed earlier hereinabove for estimating NCL and determining the initial weightings for WAN-to-WAN connections may also be applicable for WAN interfaces 406-408. For example, the initial weightings of WAN interfaces 406-408 may be configured to be a default value, such as one-hundred. Therefore, appropriately the same number of data packets are sent through each WAN interface. In one variant, instead of sending data packets according to the weightings, network sessions are established based on the weightings. For example, the processing unit of network device 101a will distribute network sessions based on the weightings. When the weightings are approximately the same for WAN interfaces 406-408, the processing unit will distribute about the same number of network sessions among WAN interfaces 406-408. In another example, if the weightings of WAN interfaces 406-408 are 20, 30, and 50, the processing unit will distribute approximately 20% of network sessions through WAN interface 406, 30% of network sessions through WAN interface 407, and 50% of network sessions through WAN interface 408.

In one variant, the initial weightings are based on NCLs. The lower the NCL a WAN interface has, the higher the weighting a WAN interface the processing unit will assign.

Figure 9:
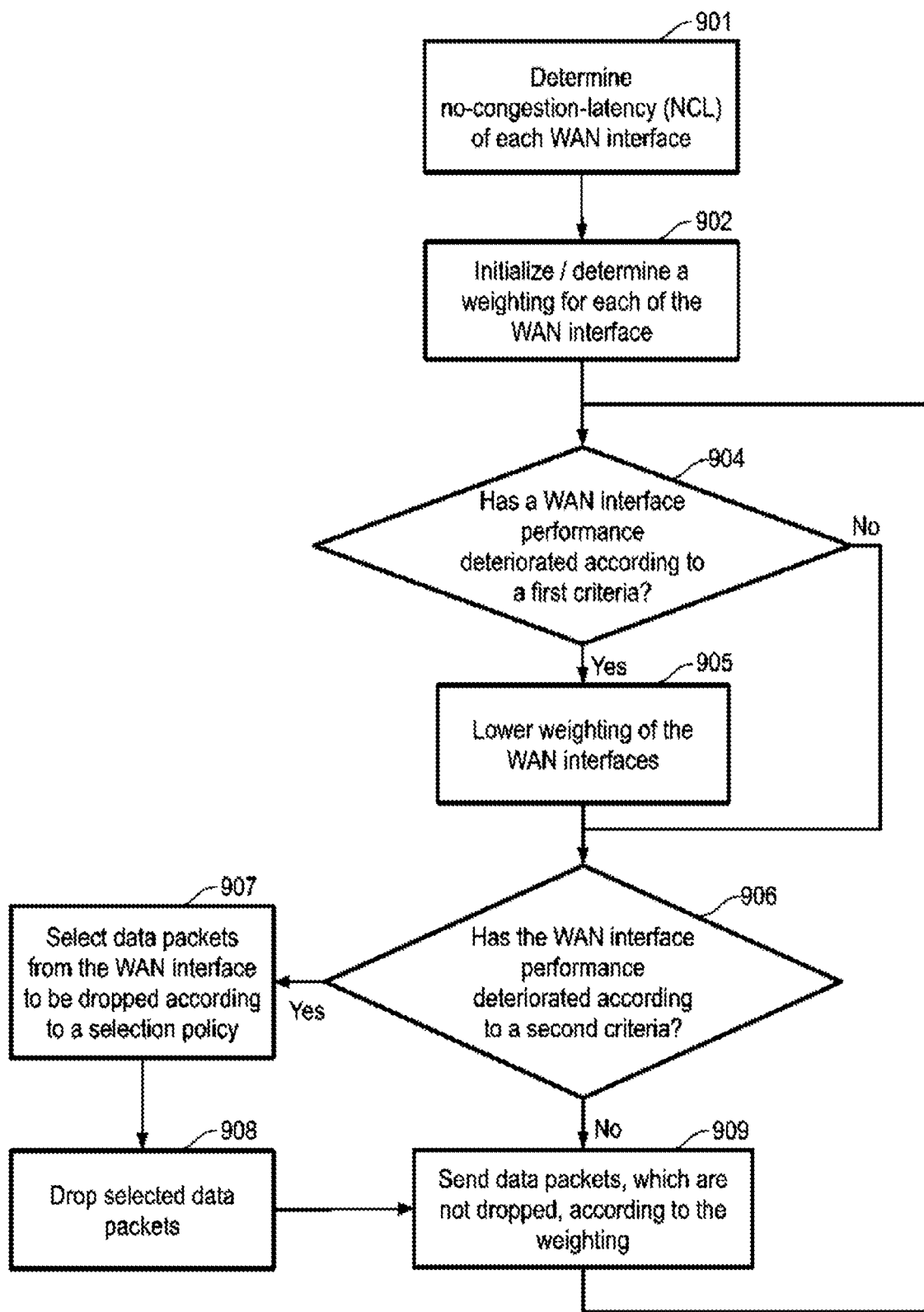
FIG. 9 is a flow diagram illustrating a method for changing the weighting of WAN interfaces while sending data packets according to the embodiments of the present invention.

FIG. 9 is a flow diagram illustrating a method for changing the weightings of WAN interfaces according to the embodiments of the present invention. FIG. 9 should be viewed in conjunction with FIG. 7 and FIG. 4A. If a WAN interface is congested, the latency of that WAN interface may then increase, and the processing unit may then lower the weighting of that WAN interface.

NCL of each of WAN interfaces 406-408 of network device 101a is estimated at process 901. Initial weightings are determined at process 902. After process 902, the processing unit of network device 101a performs process 904 to determine if a WAN interface, such as WAN interface 406, performance has deteriorated according to a first criteria. The weighting of WAN interface 406 may be updated at process 905. In process 906, the processing unit determines if WAN interface 406 deteriorates according to a second criteria. In one example, the second criteria is valid when latency has increased more than a particular percentage of the NCL of WAN interface 406, process 907 may then be performed. If the latency has increased less than the particular percentage, process 909 may then be performed. Data packets are first selected at process 907 from the queue of WAN interface 406 that satisfies the second criteria, and then dropped or removed from the queue at process 908. At process 909, the data packets are retrieved from the queue and are sent according to the weighting of each of the WAN interfaces.

In one example, the weightings of the WAN interfaces may be updated after different time intervals.

The first criteria may also further include a timing factor that the first criteria is valid for a period of time. The second criteria may also further include a timing factor that the second criteria is valid for a period of time. The details of the first criteria, the second criteria, dropping packets and the timing factor discussed earlier hereinabove for the WAN-to-WAN connections may also be applicable for the WAN interfaces.

The invention claimed is:

1. A method for distributing packets at a network device, wherein the method comprises:
   (a) determining an initial weighting for each connection in a plurality of connections according to a non-congested latency of each of the plurality of connections;
   (b) assigning a weighting to each connection in the plurality of connections;
   (c) decreasing the weighting of at least one connection in the plurality of connections if latency of the at least one connection increases to a threshold; and
   (d) distributing the packets to the plurality of connections according to the weightings;
   wherein:
      the weighting assigned to each connection in the plurality of connections at step (b) is the initial weighting of each of the plurality of connections;
      the weighting of each connection in the plurality of connections is reset after a first period of time; and
      the non-congested latency of each connection in the plurality of connections is estimated by sending a latency estimation packet and receiving an acknowledgement to the latency estimation packet through each connection in the plurality of connections.

2. The method of claim 1, wherein the weighting of each connection in the plurality of connections is updated after a time interval.

3. The method of claim 1, further comprising:
   (e) maintaining the weighting of the at least one connection unchanged if the latency of the at least one connection decreases.

4. The method of claim 1, further comprising:
   (f) increasing the weighting of the at least one connection if the latency of the at least one connection decreases.

5. The method of claim 2, wherein the time interval of each of the plurality of connections is same or different.

6. The method of claim 1, wherein when the latency of the at least one connection is lower than non-congested latency estimated for the at least one connection, the non-congested latency of the at least one connection is updated.

7. The method of claim 1, wherein the non-congested latency of each connection in the plurality of connections is estimated after every second period of time.

8. The method of claim 1, wherein the initial weighting of each connection in the plurality of connections is a default weighting of each connection in the plurality of connections.

9. The method of claim 8, wherein the default weighting of each connection in the plurality of connections is a same value.

10. A method for distributing packets at a network device, wherein the device comprises:
   (a) determining an initial weighting for each connection in a plurality of connections according to a non-congested latency of each of the plurality of connections;
   (b) assigning a weighting to each connection in the plurality of connections;
   (c) decreasing the weighting of at least one connection in the plurality of connections if latency of the at least one connection increases to a threshold;
   (d) distributing the packets to the plurality of connections according to the weightings; and
   (e) maintaining the weighting of the at least one connection unchanged if the latency of the at least one connection decreases;
   wherein:

the weighting assigned to each connection in the plurality of connections at step (b) is the initial weighting of each of the plurality of connections;
the weighting of each connection in the plurality of connections is reset after a first period of time; and
the non-congested latency of each connection in the plurality of connections is estimated by sending a latency estimation packet and receiving an acknowledgement to the latency estimation packet through each connection.

11. The method of claim 10, wherein:
the initial weighting of each connection in the plurality of connections is a default weighting of each connection in the plurality of connections;
the non-congested latency of each connection in the plurality of connections is estimated after every second period of time; and
when the latency of the at least one connection is lower than non-congested latency estimated for the at least one connection, the non-congested latency of the at least one connection is updated.

12. A network device, comprising:
a main memory;
at least one processing unit;
at least one network interface; and
at least one non-transitory computer readable storage medium;
wherein the non-transitory computer readable storage medium stores program instructions executable by the at least one processing unit for:
(a) determining an initial weighting for each connection in a plurality of connections according to a non-congested latency of each of the plurality of connections;
(b) assigning a weighting to each connection in the plurality of connections;
(c) decreasing the weighting of at least one connection in the plurality of connections if latency of the at least one connection increases to a threshold; and
(d) distributing the packets to the plurality of connections according to the weightings;
wherein:
the weighting assigned to each connection in the plurality of connections at step (b) is the initial weighting of each of the plurality of connections;
the weighting of each connection in the plurality of connections is reset after a first period of time; and
the non-congested latency of each connection in the plurality of connections is estimated by sending a latency estimation packet and receiving an acknowledgement to the latency estimation packet through each connection in the plurality of connections.

13. The network device of claim 12, wherein the weighting of each connection in the plurality of connections is updated after a time interval.

14. The network device of claim 12, wherein the at least one non-transitory computer-readable storage medium stores further program instructions executable by the at least one processing unit for:
(e) maintaining the weighting of the at least one connection unchanged if the latency of the at least one connection decreases.

15. The network device of claim 12, wherein the at least one non-transitory computer-readable storage medium stores further program instructions executable by the at least one processing unit for:
(f) increasing the weighting of the at least one connection if the latency of the at least one connection decreases.

16. The network device of claim 13, wherein the time interval of each of the plurality of connections is same or different.

17. The network device of claim 12, wherein when the latency of the at least one connection is lower than non-congested latency estimated for the at least one connection, the non-congested latency of the at least one connection is updated.

18. The network device of claim 12, wherein the non-congested latency of each connection in the plurality of connections is estimated after every second period of time.

19. The network device of claim 12, wherein the initial weighting of each connection in the plurality of connections is a default weighting of each connection in the plurality of connections.

20. The network device of claim 19, wherein the default weighting of each connection in the plurality of connections is a same value.

* * * * *